INVENTORS
HERBERT B. FERNALD
BERNARD H. GWYNN
ALFRED N. KRESGE

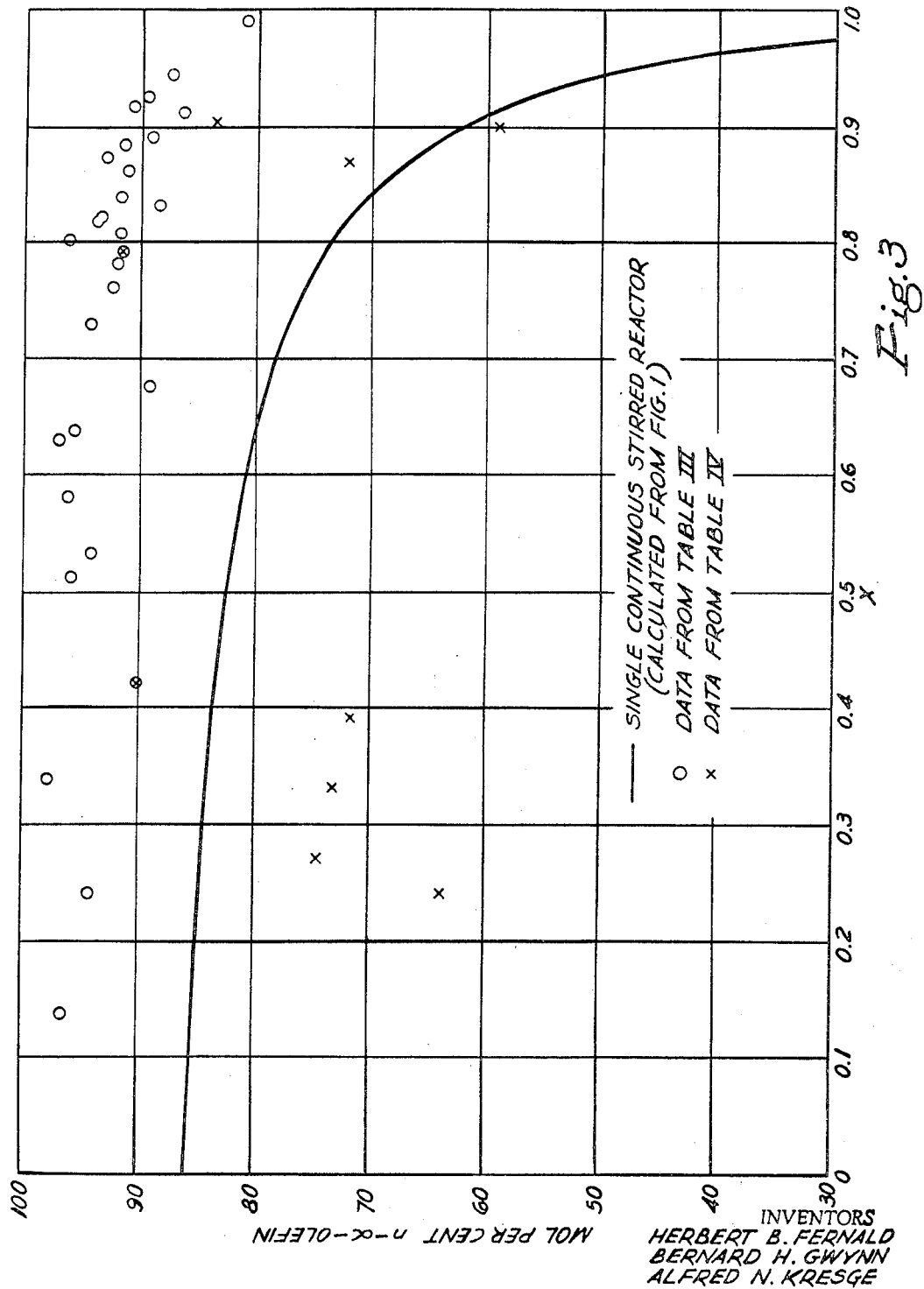

United States Patent Office 3,482,000
Patented Dec. 2, 1969

3,482,000
POLYMERIZATION OF ETHYLENE TO NORMAL ALPHA OLEFINS WITH A TRIALKYLALUMINUM CATALYST IN A TUBULAR REACTOR
Herbert B. Fernald, Glenshaw, Pa., Bernard H. Gwynn, Leawood, Kans., and Alfred N. Kresge, Verona, Pa., assignors to Gulf Research & Development Company, Pittsburgh, Pa., a corporation of Delaware
Continuation-in-part of application Ser. No. 153,815, Nov. 21, 1961. This application Jan. 9, 1967, Ser. No. 608,127
Int. Cl. C07c 3/10
U.S. Cl. 260—683.15                    7 Claims

ABSTRACT OF THE DISCLOSURE

A process for the polymerization of ethylene to normal and branched α-olefins in the presence of an organo metallic catalyst. An unexpectedly high selectivity towards normal α-olefins is achieved by performing the reaction in a tubular reaction zone wherein the amount of polymer increases throughout the length of he reactor tube. The reaction temperature is between about 180° and 240° C., there is between about $1 \times 10^{-4}$ and $1 \times 10^{-2}$ mols of catalyst per mol of ethylene, and the polymerization proceeds until there is a conversion of at least about 30 percent of said ethylene to polymer product.

Figure 2:
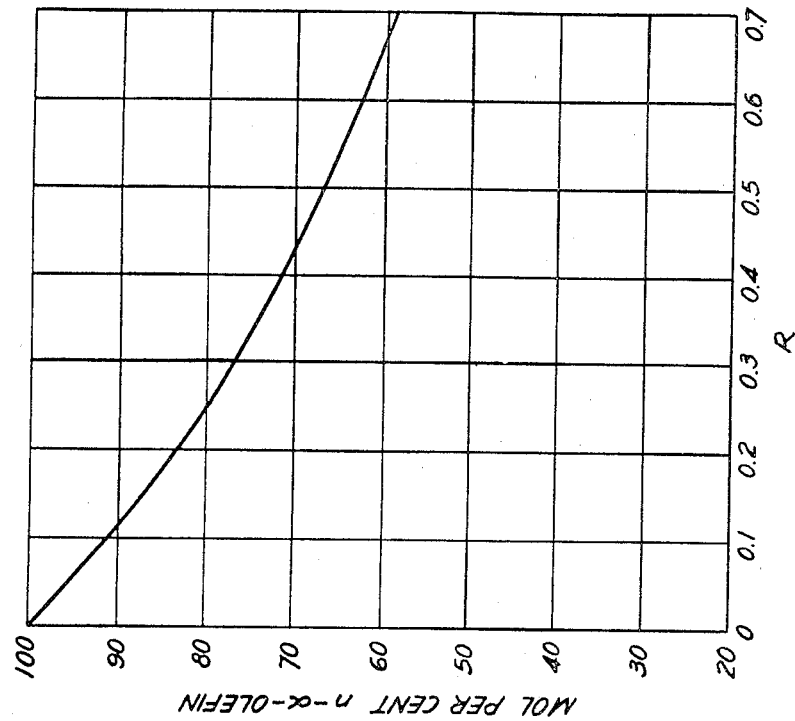
Figure 1:
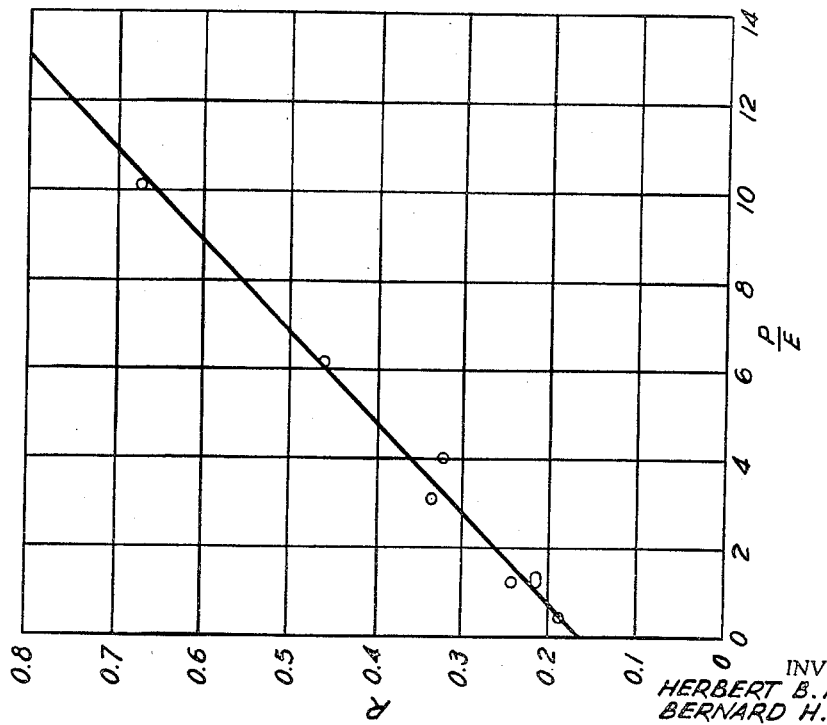

--- formations of olefins other than n-α-olefins to n-α-olefins, in mols, at any particular point in the system is proportional to the weight ratio of product ($C_4$ and higher olefins) to unreacted ethylene at such point. This can be seen from the following example.

EXAMPLE I

Into an autoclave having a volume of 860 milliliters equipped with a stirrer to maintain the contents thereof in a substantially homogeneous state, and which was maintained at a temperature of 200° C. and a pressure of 4000 pounds per square inch gauge, there was introduced continuously over a period of 10.25 hours 31.0 grams per minute of a mixture comprising 94.35 percent by weight of ethylene, 4.45 percent by weight of heptane solvent and 1.20 percent by weight of triethylaluminum. There was continuously removed from the autoclave 31.0 grams per minute of product. The product was discharged continuously to a gas-liquid separator maintained at 130° F. and atmospheric pressure. The effluent gases were measured and analyzed. The liquid reaction product was then subjected to hydrolysis, in order to destroy the catalyst, with 10 percent by weight of a 20 percent aqueous solution of sulfuric acid. The organic layer was washed with an equal volume of water and dried with anhydrous calcium sulphate. Similar runs were made at different ratios of total polymer to unreacted ethylene. The data obtained are set forth below in Table I.

TABLE I

| Run No | 1 | 2 | 3 | 4 | 5 | 6 | 7 | 8 |
|---|---|---|---|---|---|---|---|---|
| V/F or (Volume of Reactor in Milliliters)/ Total Feed in Grams Per Hour) | 0.463 | 0.558 | 0.549 | 0.507 | 0.585 | 0.617 | 0.672 | 0.724 |
| Percent by Weight of Catalyst in Feed | 12.0 | 1.57 | 1.41 | 1.44 | 1.62 | 1.73 | 1.80 | 1.96 |
| Percent by Weight of Solvent in Feed | 4.45 | 5.83 | 5.22 | 5.34 | 6.00 | 6.55 | 6.65 | 7.29 |
| Percent by Weight of Ethylene in Feed | 94.35 | 92.60 | 93.37 | 93.22 | 92.38 | 91.82 | 91.55 | 90.75 |
| Percent by Weight of Ethylene Converted | 30.4 | 55.5 | 56.4 | 57.5 | 75.6 | 80.1 | 86.1 | 91.0 |
| Mols of n-α-olefin Polymer in Product/ Total Mols of Olefin Polymer in Product | 84.1 | 82.2 | 80.4 | 82.2 | 74.9 | 75.6 | 68.4 | 59.8 |
| R or (Mols of Internal and Branched Chain Terminal Olefin)/ (Mols of n-N-olefin Polyemr) | 0.189 | 0.216 | 0.244 | 0.216 | 0.336 | 0.323 | 0.462 | 0.673 |
| P/E or (Weight of Total Polymer in Product)/ (Weight of Ethylene in Product) | 0.436 | 1.248 | 1.292 | 1.353 | 3.100 | 4.02 | 6.19 | 10.11 |

This application is a continuation-in-part of Ser. No. 153,815, filed Nov. 21, 1961, now abandoned.

This invention relates to a process for the polymerization of ethylene and more particularly to a process for the polymerization of ethylene to obtain a product predominating in α-olefins.

Ethylene can be polymerized at elevated temperatures in the presence of an organo metallo compound to obtain a product containing olefins having from four to twenty and even higher number of carbon atoms. The olefin product so produced includes straight and branched internal olefins and straight and branched terminal or α-olefins. The latter olefins are extremely attractive for use in many chemical reactions, for example in reactions with aromatics ultimately to produce synthetic detergents. It would be extremely desirable, therefore, to operate such process so that a maximum amount of α-olefins are produced and little or no straight and/or branched internal olefins are obtained.

We have found that ethylene can be polymerized at elevated temperatures in the presence of an organo metallo compound to obtain a product predominating in α-olefins by the relatively simple expedient of carrying out the reaction continuously in a plurality of stages, preferably in an infinite number of stages, wherein the amount of polymer relative to said ethylene is different in each of said stages.

We have discovered in the above-defined reaction, regardless of the type of system in which the same is carried out, that the ratio R, or the instantaneous rate of The data so obtained are graphically represented in FIGURE I wherein the ratio R (mols of internal and branched chain terminal olefins to mols of N-α-olefins) is plotted against the weight ratio of total polymer in the product to ethylene, P/E. FIGURE II is a graphical representation of data obtained from FIGURE I wherein the mol percent of n-α-olefin in the polymer product is plotted against the previously-defined ratio R.

In a continuous stirred autoclave, that is, wherein over the course of the reaction the weight of the material entering the autoclave is equal or about equal to the weight of material leaving the autoclave and substantially complete mixing is obtained, other conditions being about the same, the composition of the contents of the autoclave and the material leaving or product obtained is substantially constant with time. Therefore, the average composition of the product obtained in a continuous stirred autoclave is substantially equal to the instantaneous composition of the contents of the reactor, and the weight ratio, P/E, of polymer in the product at any point in the contents of the autoclave to the unreacted ethylene can be represented by the following equation:

$$(1) \qquad \frac{P}{E} = \frac{x}{1-x}$$

wherein x represents the fractional conversion of ethylene to $C_4$ polymers and higher.

The significant difference in the n-α-olefin content of the product obtained in the polymerization process described herein when the same is carried out in a coil or even in a series of continuous stirred autoclaves rather than in a single continuous stirred autoclave is illustrated by the following, employing therefor the equation derived above and data in FIGURES I and II. In a continuous stirred autoclave wherein a conversion of 90 percent of ethylene to polymer is obtained $$\frac{P}{E} = \frac{x}{1-x} = \frac{0.9}{1-0.9} = 9.0$$

From FIGURE I it can be seen that when $P/E=9$, $R=0.605$. According to FIGURE II, when $R=0.605$ the percent n-α-olefin in the product amounts to 62.4 percent. Where the process is carried out in two continuous stirred autoclaves to obtain a conversion of 90 percent of the ethylene to polymer, and the same amount of reaction takes places in each, $x$ in the first stage is equal to 0.45, in the second stage to 0.9. Therefore $P/E$ in the first stage is equal to $$\frac{0.45}{1-0.45} = \frac{0.45}{0.55} = 0.818$$

and in the second stage to $$\frac{0.9}{1-0.9} = \frac{0.9}{0.1} = 9.0$$

According to FIGURE I in such case $R=0.204$ for the first stage and 0.605 for the second stage. From FIGURE II it can be seen that 83.1 mol percent of the olefin polymers formed in the first stage is n-α-olefin, but only 62.4 mol percent of the olefin polymers formed in the second stage is n-α-olefin. Since equal amounts of reaction occur in each stage, the effluent from the second stage will be the average of the two or 72.8 mol percent n-α-olefin. Similarly, three, four or more stages can be calculated.

The data obtained above have been tabulated below in Table II. For purposes of comparison, Table II also contains data obtained using a coil reactor wherein 90 percent of the ethylene was converted to polymer. The data for the coil reaction was obtained from FIGURE III, which will be discussed hereinafter. The data in Table II show that the amount of n-α-olefin in the product is always greater when the polymerization reaction is carried out in a coil reactor rather than in a single continuous stirred autoclave or series of stirred autoclaves for the same total conversion of ethylene to polymer. Equal conversion per stage was used for convenience of calculation. Other combinations will give somewhat different results, but in no case will a finite number of autoclaves in series yield results better than a coil reactor for the same level of ethylene conversion. In Table II $x$ and $R$ are as defined hereinabove, and n-α-refers to n-α-olefins.

TABLE II

| Type of Reactor | Number of Stages | Stage 1 | | | Stage 2 | | | Stage 3 | | | Stage 4 | | | Mol Percent n-α-olefin in Polymer Product |
|---|---|---|---|---|---|---|---|---|---|---|---|---|---|---|
| | | $x$ | R | Mol Percent n-α | $x$ | R | Mol Percent n-α | $x$ | R | Mol Percent n-α | $x$ | R | Mol Percent n-α | |
| Coil | (1) | | | | | | | | | | | | | 89.0 |
| Stirred Flow Autoclave | 1 | 0.9 | 0.605 | 62.4 | | | | | | | | | | 62.4 |
| Do | 2 | 0.45 | 0.204 | 83.1 | 0.9 | 0.605 | 62.4 | | | | | | | 72.8 |
| Do | 3 | 0.3 | 0.186 | 84.3 | 0.6 | 0.238 | 80.8 | 0.9 | 0.605 | 62.4 | | | | 75.8 |
| Do | 4 | 0.24 | 0.178 | 84.8 | 0.45 | 0.204 | 83.1 | 0.675 | 0.265 | 79.0 | 0.9 | 0.605 | 62.4 | 77.3 |

1 Infinite.

From the above it is apparent that for the same amount of ethylene converted to polymer the largest amount of n-α-olefins is obtained in a coil reactor. In a single continuous stirred autoclave the amount of n-α-olefin obtained was reduced appreciably over the amount obtained in a coil reactor. Even the use of two continuous stirred autoclaves in series resulted in a significant increase in the amount of n-α-olefin produced, and this increase is maintained and enlarged by the further use of more continuous stirred autoclaves in series.

That the amount of n-α-olefin in the product is always greater when the polymerization reaction is carried out in a coil reactor rather than in a single continuous stirred autoclave at equal conversion of ethylene to polymer is further seen from the following.

EXAMPLE II

Into one end of a stainless steel coil having a length of 101.5 feet and an internal diameter of 0.25 inch there was continuously introduced 26.8 grams per minute at 4000 pounds per square inch gauge and 200° C. of a mixture comprising 86.50 percent by weight of ethylene, 12.05 percent by weight of heptane solvent and 1.45 per-

TABLE III

| Run No. | Tubular Reactor | | Temperature, °C. | Pressure, p.s.i.g. | Feed Composition, Wt. Percent | | | V/F | Percent Ethylene Converted | α-olefin Content Polymer, Mol Percent | |
|---|---|---|---|---|---|---|---|---|---|---|---|
| | Length, Feet | Inside Diameter, Inches | | | Ethylene | Catalyst | Solvent | | | $RCH=CH_2$ | $RC_2=CH$ |
| 9 | 101.5 | 0.25 | 200 | 4,000 | 91.4 | 1.01 | 8.59 | 0.420 | 13.5 | 96.5 | 0 |
| 10 | 101.5 | 0.25 | 200 | 4,000 | 90.4 | 1.03 | 7.57 | 0.453 | 24.0 | 94.2 | 0 |
| 11 | 75.0 | 0.195 | 200 | 4,000 | 90.2 | 1.18 | 8.62 | 0.450 | 33.8 | 97.8 | 0 |
| 12 | 75.0 | 0.195 | 200 | 4,000 | 88.1 | 1.40 | 10.50 | 0.524 | 51.2 | 96.0 | 1.0 |
| 13 | 101.5 | 0.25 | 200 | 4,000 | 88.3 | 1.27 | 10.43 | 0.554 | 53.2 | 94.2 | 1.0 |
| 14 | 75.0 | 0.195 | 200 | 4,000 | 88.1 | 1.43 | 10.47 | 0.409 | 57.8 | 96.0 | 1.0 |
| 15 | 64.0 | 0.1875 | 200 | 4,000 | 90.0 | 1.36 | 8.64 | 0.656 | 62.7 | 97.0 | 2.0 |
| 16 | 540.0 | 0.250 | 200 | 4,000 | 91.5 | 0.99 | 7.51 | 0.683 | 63.5 | 95.6 | 2.0 |
| 17 | 540.0 | 0.250 | 200 | 4,000 | 90.6 | 1.12 | 8.28 | 0.675 | 72.7 | 94.3 | 2.0 |
| 18 | 540.0 | 0.250 | 200 | 4,000 | 91.5 | 1.02 | 7.48 | 0.704 | 83.8 | 91.8 | 3.0 |
| 19 | 64.0 | 0.187 | 200 | 4,000 | 87.0 | 1.55 | 11.45 | 0.642 | 80.0 | 96.3 | 3.0 |
| 20 | 101.5 | 0.25 | 200 | 4,000 | 86.5 | 1.45 | 12.05 | 0.631 | 80.6 | 91.8 | 1.5 |
| 21 | 101.5 | 0.25 | 200 | 4,000 | 82.1 | 1.36 | 16.54 | 0.581 | 82.0 | 93.5 | 2.3 |
| 22 | 64.0 | 0.1875 | 200 | 4,000 | 86.6 | 1.59 | 11.81 | 0.674 | 87.3 | 93.0 | 5.0 |
| 23 | 75.0 | 0.195 | 200 | 4,000 | 85.3 | 1.78 | 12.92 | 0.697 | 94.4 | 87.5 | 9.0 |
| 24 | 101.5 | 0.25 | 200 | 4,000 | 85.4 | 1.57 | 13.03 | 0.677 | 99.0 | 81.0 | 8.5 |
| 25 | 64.0 | 0.1875 | 220 | 4,000 | 90.5 | 1.16 | 8.34 | 0.488 | 88.7 | 89.1 | 9.0 |
| 26 | 75.0 | 0.195 | 215 | 4,000 | 89.2 | 1.28 | 9.52 | 0.522 | 88.3 | 91.5 | 6.4 |
| 27 | 64.0 | 0.1875 | 210 | 4,000 | 88.0 | 1.44 | 10.56 | 0.610 | 91.6 | 90.8 | 7.4 |
| 28 | 64.0 | 0.1875 | 210 | 4,000 | 88.7 | 1.36 | 9.94 | 0.564 | 83.2 | 88.5 | 6.0 |
| 29 | 101.5 | 0.25 | 190 | 4,000 | 85.1 | 2.14 | 12.76 | 0.698 | 92.5 | 89.5 | 2.7 |
| 30 | 101.5 | 0.25 | 180 | 4,000 | 82.4 | 2.51 | 15.09 | 0.823 | 86.1 | 91.2 | 2.0 |
| 31 | 50.0 | 0.125 | 227 | 2,900 | 87.8 | 1.17 | 11.03 | 0.512 | 75.8 | 92.4 | 4.3 |
| 32 | 50.0 | 0.125 | 215 | 2,550 | 73.8 | 1.43 | 24.77 | 0.604 | 42.0 | 90.0 | 0 |
| 33 | 25.0 | 0.25 | 225 | 2,900 | 89.7 | 1.12 | 9.18 | 1.100 | 79.0 | 91.5 | 5.1 |
| 34 | 25.0 | 0.25 | 240 | 2,900 | 85.4 | 0.84 | 13.76 | 0.797 | 67.5 | 89.2 | 7.5 |
| 35 | 25.0 | 0.25 | 225 | 3,900 | 82.9 | 0.990 | 16.11 | 0.857 | 78.0 | 92.0 | 3.1 |
| 36 | 25.0 | 0.25 | 225 | 3,900 | 45.52 | 0.636 | 53.84 | 0.681 | 91.1 | 86.5 | 8.3 |
| 37 | 25.0 | 0.25 | 225 | 3,900 | 83.7 | 0.960 | 15.34 | 0.823 | 81.7 | 93.8 | 0 | cent by weight of triethyl aluminum. 26.8 grams of product was continuously removed at the exit end of the coil. The product removed from the coil was treated as in Example I and analyzed for its α-olefin content. The data as well as the α-olefin content of this run are listed in preceding Table III as Run No. 20. The data from additional runs made in tubular reactors at various reaction conditions are also set forth in Table III. In Runs Nos. 9 to 31 triethyl aluminum was employed as catalyst, while in Runs Nos. 32 to 37 triisobutyl aluminum was the catalyst. In all of the runs except Runs Nos. 36 and 37 the solvent employed was n-heptane. In Run No. 36 the solvent consisted of 49.3 percent by weight of n-hexene-1 and 50.7 percent by weight of butene-1, while in Run No. 37 the solvent was n-hexene-1. $V/F$ in the table has the same meaning assigned to it in Table I. The α-olefin content is given in terms of straight chain and branched chain terminal olefins.

The data of Tables I and II are graphically illustrated in FIGURE III wherein the mol percent of n-α-olefin in the product is plotted against $x$, which is the fractional conversion of ethylene to $C_4$ polymers and higher. It can be seen that for the same amount of ethylene converted to polymer, the amount of n-α-olefin in the polymer product obtained in the coil is always greater than the amount of n-α-olefin in the polymer product obtained in the single stirred flow autoclave. Moreover, FIGURE III shows that at fractional conversions of ethylene in the range from above 0 to 30 percent, the improvement of a coil reactor of this invention over a stirred autoclave is comparatively smaller and more constant than in higher fractional conversion ranges. In this very low fractional conversion range, especially where there is a negligible quantity of product, the improvement in the coil reactor is probably due merely to efficiencies inherent in continuous over batch operation. In contrast, FIGURE III shows that at fractional conversions above about 30, 40 or 50 percent the improvement due to the effect of this invention starts to become manifest. The improvement of the coil reactor over the stirred autoclave increases steadily from these intermediate fractional conversion levels until nearly complete ethylene conversion is reached. However, FIGURE III shows that it is desirable to avoid a fractional conversion of ethylene greater than about 85 or 90 percent because at these very high conversion levels a drop of the n-α-olefin content even in a coil reactor effluent begins to occur.

Residence times in accordance with this invention will generally be at least about 5 minutes, preferably at least about 10 minutes, and most preferably at least about 20 to 30 minutes.

Not only must the reaction defined herein be carried out continuously in a plurality of stages, preferably in an infinite number of stages, but it is critical that the pressure of the reaction be maintained at all times in excess of at least about 1000 pounds per square inch gauge, preferably at least about 2000 pounds per square inch gauge. This is shown below in Table IV. In all of its aspects this table is similar to Table III. The solvent employed was n-heptane. In each of Runs Nos. 40, 41, 42, 43 and 44 the catalyst was triethyl aluminum, while in Runs Nos. 38, 39, 45 and 46 the catalyst was triisobutyl aluminum. The data from Table IV are also graphically illustrated in FIGURE III.

From the above it is apparent that best results are obtained by carrying out the reaction described herein in an infinite number of stages, and that for purposes of this invention such system is best exemplified by a tubular reactor which is a reactor having an elongated reaction zone. A tubular reactor as herein employed can be said to possess an infinite number of stages, because each increment thereof is separate and distinct in its composition from any and all other increments which can be said to form a part thereof. The elongated reaction zone is defined as one wherein little or no back mixing of the contents thereof occurs and wherein the elongation factor (ratio of length to inner diameter) is generally in excess of about five. A single continuous stirred autoclave has been shown to be ineffective for purposes of this invention, while a plurality of such autoclaves, which can theoretically approach the system in a coil, can be effective. Another system which can exist is a continuous autoclave similar to the one described above but which is not intentionally stirred. In the event only a small amount of stirring occurs therein as a result of mixing or otherwise, it is seen that a plurality of separate and distinct stages are present therein, and therefore such system is comprehended for use in carrying out the process of this invention. Should the amount of mixing be increased and somewhat approach the system of a continuous stirred autoclave wherein the mixture therein approaches homogeneity, it is apparent that the same is not suitable for use in the practice of this invention.

In view of the fact that the production of n-α-olefins is the object of the process defined herein, ethylene is the sole olefin which can be employed in the charge. The product obtained, as noted, will predominate in n-α-olefins and will constitute generally at least about 70 molar percent thereof, preferably at least about 85 molar percent. The n-α-olefins produced will have from four to 40 or more carbon atoms.

The catalyst employed can be defined by the following structural formula: $M'_a M_b R_c X_d$, wherein M′ is a metal selected from the alkali or alkaline earth metals and $a$ can be either 0 or one; M is a metal selected from the group consisting of aluminum, gallium, indimum and beryllium and $b$ can be either 0, one or two; R is selected from the group consisting of monovalent saturated aliphatic or alicyclic radicals, monovalent aromatic radicals or any combination thereof; X is selected from the group consisting of hydrogen and halogen. The sum of $c$ and $d$ is equal to the total valences represented by the metals, and when X is a halogen $c$ must be at least one. Examples of catalysts which can be employed include $Be(C_2H_5)_2$, $LiC_2H_5$, $AlH_3$, $HAl(CH_3)_2$, $H_2AlC_2H_5$ $Al(CH_3)_3$, $Al(C_2H_5)_3$, $Al(C_4H_9)_3$, $Al(C_3H_7)_3$ $Al(C_6H_5)_3$, $Ga(CH_3)_3$, $Ga(C_2H_5)_3$, $In(C_2H_5)_3$, $In(CH_3)_3$ $Be(C_6H_5)_2$, $Na(C_5H_{11})$, $Al(C_2H_5)_2Cl$, $Al(C_2H_5)Cl_2$ $Al(C_4H_9)_{1.5}Cl_{1.5}$, $Al(C_4H_9)_2Cl$, $LiAlH_4$, $NaAlH_4$ $LiAl(C_2H_5)_4$, $NaAl(C_4H_9)_4$, $Mg(AlH_4)_2$, $Zn(C_2H_5)_2$, etc.

The catalyst can be used as such, but preferably is employed with about 70 to about 99 percent by weight thereof of an inert hydrocarbon solvent such as saturated aliphatics (n-pentane, isopentane, hexane, n-heptane, isooctane, n-

TABLE IV

| Run No. | Tubular Reactor | | Temperature, °C. | Pressure, p.s.i.g. | Feed Composition, Wt. Percent | | | V/F | Percent Ethylene Converted | α-olefin Content of Polymer, Mol Percent | |
|---|---|---|---|---|---|---|---|---|---|---|---|
| | Length, Feet | Inside Diameter, Inches | | | Ethylene | Catalyst | Solvent | | | $RCH=CH_2$ | $R_2C=CH_2$ |
| 38 | 50.0 | 0.125 | 215 | 825 | 56.91 | 1.56 | 41.53 | 0.887 | 33.0 | 73.2 | 4.5 |
| 39 | 50.0 | 0.125 | 185 | 842 | 57.30 | 1.45 | 41.25 | 0.913 | 24.0 | 63.8 | 6.8 |
| 40 | 75.0 | 0.195 | 215 | 850 | 88.0 | 1.46 | 10.54 | 0.576 | 90.0 | 59.2 | 30.6 |
| 41 | 75.0 | 0.195 | 215 | 850 | 92.2 | 0.92 | 6.88 | 0.383 | 27.0 | 74.5 | 14.2 |
| 42 | 75.0 | 0.195 | 185 | 850 | 90.0 | 1.20 | 8.80 | 0.475 | 39.0 | 71.7 | 16.6 |
| 43 | 75.0 | 0.195 | 215 | 1,500 | 87.5 | 1.40 | 11.10 | 0.586 | 86.6 | 72.2 | 18.1 |
| 44 | 75.0 | 0.195 | 215 | 2,500 | 89.2 | 1.29 | 9.51 | 0.445 | 90.2 | 83.6 | 11.9 |
| 45 | 50.0 | 0.125 | 215 | 2,550 | 73.8 | 1.43 | 24.77 | 0.604 | 42.0 | 90.0 | 7.0 |
| 46 | 25.0 | 0.250 | 225 | 2,900 | 89.7 | 1.12 | 9.18 | 1.100 | 79.0 | 91.5 | 5.1 | dodecane, merusol oil, paraffinic oils, kerosene, etc.), alicyclics such as cyclohexane, cyclopentane, etc., aromatics such as benzene, toluene, etc. Initiators, activators or inhibitors (other than the catalyst defined above) are not needed in the presence defined, and yet a polymer product having a high α-olefin content over the entire range of polymer obtained is assured. The amount of catalyst required herein is not critical and can be from about $1 \times 10^{-4}$ to about $1 \times 10^{-2}$ mols thereof per mol of ethylene. These ratios permit repeated alkyl growth and splitting cycles at each molecule of catalyst to produce a great many mols of α-olefin per mol of catalyst.

The temperature of the reaction is between about 180° and 220° or 240° C. Temperatures below this range tend to favor only the growth of alkyl groups on the catalyst, temperatures above this range tend to flavor only the splitting of alkyl groups from a growth product, while temperatures within this range favor both growth and splitting reactions. The upper range of pressure employed is not critical and can be as high as about 1000 atmospheres or even higher, but the lower perssure range, however, is critical. In order to assure reaction of ethylene at all times and to avoid the reaction of polymer, it is critical in the process of this invention that the pressure in the reactor be at all times sufficiently high to maintain the ethylene and the contents of the reactor substanially in a single phase. By "single phase" we mean to refer to a system wherein all of the components thereof are substantially of the same state of existence and are homogeneously distributed throughout said system. Thus the pressure in the reactor must at all times be at least about 1000, preferably at least about 2000 pounds per square inch gauge. The great advantage of employing a multiple number of stages, particularly a coil or tubular reactor, in the process of this invention resides in the fact that once having selected a reaction pressure to maintain a single phase operation, the same is maintained throughout the course of the reaction, and there is no danger that as the ethylene is polymerized a pressure reduction will ensue and a two phase system, with its attendant disadvantages, will exist.

As soon as it is desired to terminate the reaction, the product obtained is treated in any suitable manner to deactivate the catalyst and the desired portions of the gross product are recovered. Thus, the gross product is reduced to atmospheric temperature and atmospheric pressure, upon which the gaseous olefins are flashed off. The catalyst is deactivated, for example, by contact with sufficient acid, base, water or alcohol to react stoichiometrically with the catalyst. For example when an acid or base is employed an aqueous layer is formed, which is then separated from the organic layer, and the remainder, including the solvent, can be separated into its component parts by distillation. If desired the catalyst can be deactivated by contact with oxygen or halogens or any other material which reacts with and suitably destroys the catalytic activity of organo metallo compounds.

Obviously, many modifications and variations of the invention as hereinabove set forth, can be made without departing from the spirit and scope thereof, and therefor only such limitations should be imposed as are indicated in the appended claims.

We claim:

1. A process for polymerizing ethylene to obtain a product predominating in normal alpha olefins having from four to 40 carbon atoms which comprises continuously subjecting ethylene to polymerization conditions at a temperature of about 180° to about 240° C. in the presence of trialkylamluminum as substantially the sole catalyst, said catalyst being present in an amount from about $1 \times 10^{-4}$ to about $1 \times 10^{-2}$ mols per mol of ethylene, in a tubular reaction zone wherein the pressure is at least about 1500 pounds per square inch gauge throughout the tubular reaction zone and the amount of polymer increases throughout the length of said tubular reaction zone, and the residence time being sufficient to polymerize at least about 30 percent of said ethylene to polymer.

2. The process of claim 1 wherein at least about 40 percent of said ethylene is polymerized to polymer product and the residence time is at least about 5 minutes.

3. The process of claim 1 wherein between about 50 and 90 percent of said ethylene is polymerized to polymer product and the residence time is at least about 5 minutes.

4. A process for polymerizing ethylene to obtain a product predominating in normal alpha olefins having from four to 40 carbon atoms which comprises continuously subjecting ethylene to polymerization conditions at a temperature of about 180° to about 240° F. in the presence of trialkylaluminum as substantially the sole catalyst, said catalyst being present in an amount from about $1 \times 10^{-4}$ to about $1 \times 10^{-2}$ mols per mol of ethylene, in a tubular reaction zone wherein the pressure is at least about 2000 pounds per square inch gauge throughout the tubular reaction zone and the amount of polymer increases throughout the length of said tubular reaction zone, and polymerizing at least about 40 percent of said ethylene to polymer with a residence time of at least about 5 minutes.

5. A process for polymerizing ethylene to obtain a product predominating in normal alpha olefins having from four to 40 carbon atoms which comprises continuously subjecting ethylene to polymerization conditions at a temperature of about 180° to about 220° C. in the presence of trialkylaluminum as substantially the sole catalyst, said catalyst present in an amount from about $1 \times 10^{-4}$ to about $1 \times 10^{-2}$ mols per mol of ethylene, in a tubular reaction zone wherein the pressure is at least about 2000 pounds per square inch gauge throughout the tubular reaction zone and the amount of polymer increases throughout the length of said tubular reaction zone, and polymerizing at least about 30 percent of said ethylene to polymer with a residence time of at least about 5 minutes.

6. A process for polymerizing ethylene to obtain a product predominating in normal alpha olefins having four to 40 carbon atoms which comprises continuously subjecting ethylene to polymerization conditions at a temperature of about 180° to about 240° C. in the presence of trialkyl aluminum as substantially the sole catalyst, said trialkyl aluminum being present in an amount from about $1 \times 10^{-4}$ to about $1 \times 10^{-2}$ mols per mol of ethylene, in a tubular reaction zone wherein the pressure is at least about 1500 pounds per square inch gauge throughout the tubular reaction zone and the amount of polymer increases throughout the length of said tubular reaction zone, and polymerizing at least about 30 percent of said ethylene to polymer with a residence time of at least 5 minutes.

7. The process of claim 6 wherein said trialkyl aluminum is triethyl aluminum.

No references cited.

PAUL M. COUGHLAN, Jr., Primary Examiner

PO-1050
(5/69)

UNITED STATES PATENT OFFICE
CERTIFICATE OF CORRECTION

Patent No. 3,482,000    Dated December 2, 1969

Inventor(s) Herbert B. Fernald, Bernard H. Gwynn and Alfred N. K

It is certified that error appears in the above-identified patent and that said Letters Patent are hereby corrected as shown below:

In TABLE I, Run No. 1, second line, "12.0" should read --1.20--.

In TABLE I, Run No. 6, third line, "6.55" should read --6.45--

In TABLE I, three lines from bottom, "n-N-olefin" should read --n-$\alpha$-olefin--.

In TABLE III, last column, "$RC_2=CH$" should read -- $R_2C=CH_2$ -

Column 5, line 19, "II" should read --III--.

Column 6, line 42, "indimum" should read --indium--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents